US 6,987,553 B2

(12) United States Patent
Kang et al.

(10) Patent No.: US 6,987,553 B2
(45) Date of Patent: Jan. 17, 2006

(54) LIQUID CRYSTAL DISPLAY DEVICE WITH COLUMN SPACERS

(75) Inventors: Dong Ho Kang, Kumi-shi (KR); Jae Seok Park, Kumi-shi (KR); Chung Sun Lim, Seoul (KR); Jin Ho Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/024,582

(22) Filed: Dec. 21, 2001

(65) Prior Publication Data

US 2002/0089636 A1    Jul. 11, 2002

(30) Foreign Application Priority Data

Dec. 22, 2000  (KR) .............................. P2000-80213

(51) Int. Cl.
*G02F 1/1339*    (2006.01)
(52) U.S. Cl. ...................... 349/156; 349/155; 349/157
(58) Field of Classification Search ........ 349/155–158; 427/600
See application file for complete search history.

(56) References Cited

U.S. PATENT DOCUMENTS

| | | | | |
|---|---|---|---|---|
| 5,328,728 A | * | 7/1994 | Swirbel et al. | 427/600 |
| 5,499,128 A | * | 3/1996 | Hasegawa et al. | 349/155 |
| 5,978,061 A | * | 11/1999 | Miyazaki et al. | 349/155 |
| 6,226,067 B1 | * | 5/2001 | Nishiguchi et al. | 349/155 |
| 6,335,779 B1 | * | 1/2002 | Morii | 349/158 |
| 6,392,736 B1 | * | 5/2002 | Furukawa et al. | 349/158 |
| 6,396,559 B1 | * | 5/2002 | Kishimoto et al. | 349/156 |
| 6,583,846 B1 | * | 6/2003 | Yanagawa et al. | 349/155 |
| 6,671,025 B1 | * | 12/2003 | Ikeda et al. | 349/156 |

* cited by examiner

*Primary Examiner*—Huyen Ngo
(74) *Attorney, Agent, or Firm*—Morgan, Lewis & Bockius LLP

(57) ABSTRACT

An LCD device includes a TFT substrate including a plurality of pixels of R, G, and B; a color filter substrate that is spaced apart from the TFT substrate; a plurality of column spacers selectively formed on one of the TFT substrate and the color filter substrate, the column spacers having a semi-spherically-shaped end portion adjacent to the other; and a liquid crystal layer injected between the TFT substrate and the color filter substrate.

6 Claims, 3 Drawing Sheets

LIQUID CRYSTAL DISPLAY DEVICE WITH COLUMN SPACERS

This application claims the benefit of Korean Patent Application No. P2000-80213 filed in Korea on Dec. 22, 2000, which is hereby incorporated by reference.

BACKGROUND OF THE INVENTION

1. Field of the Invention

The present invention relates to a liquid crystal display (LCD), and more particularly, to an LCD device having column spacers with a semi-spherical shape in an upper portion.

2. Discussion of the Related Art

Generally, in an LCD, two substrates that are formed apart from each other are attached by forming a liquid crystal (LC) injection hole around them. A liquid crystal (LC) is injected between the two substrates through the LC injection hole, and the two substrates maintain a constant cell gap.

A spacer is generally used to maintain the cell gap between the two substrates. Such a spacer may come in various shapes and be formed of various materials.

The recent trend in thin and light LCD devices has increased the desirability of finely and stably controlled cell gaps. This is because cell gaps have a close relationship with display characteristics of an LCD, such as response time, contrast, viewing angle and color.

To maintain a finely and stably controlled cell gap, a method for dispersing fine spacer particles into an LC cell is generally used. Glass or plastic may be used, for example, as materials of the spacer particles.

A spacer formed of glass may be formed in a stick shape at a length of about 20 to 120 $\mu$m from a glass fiber obtained by emitting non-alkali glass. A main component of a spacer formed of glass is $SiO_2$. A spacer formed of glass is generally heat-proof, has good chemical resistance, and hardness. Therefore, deformation of such a spacer due to a heavy load is not likely to occur. Also, a spacer formed of even a small amount of glass is effective and reacts with liquid crystal only minimally.

A spacer formed of plastic, on the other hand, may be formed from a synthetic resin and may be divided into a thermoplastic type and a thermal hardening type, according to the kind of resin. Compared with a spacer formed of glass, a spacer formed of plastic has low hardness, and is easily deformed by a heavy load. Therefore, a spacer formed of plastic has to maintain a higher dispersion density than that of the spacer formed of glass.

A cell gap is maintained by a spacer by inducing the spacer on a substrate using a dispersion device. Also, without using a particle type spacer, it is possible to form a fixed type spacer attached to a substrate. A fixed type spacer has a greater width, a higher resolution in an LC cell, a space optical modulation element, and does not cause the picture quality to be damaged.

Generally, a method known as photo-etching is used eliminate unnecessary parts of a semiconductor device by optical or chemical methods to form a predetermined pattern on a substrate or a thin film of an insulating material, a semiconductor or a conductor. Also, photo-etching enables the layers of the semiconductor device to be formed finely.

A column spacer technique has been proposed in which resist is deposited on a substrate at a predetermined thickness using photo-etching. The resist is exposed by irradiating UV, X-ray, or electron ray, and chemically processed so that a fixed type spacer is directly formed on an arbitrary position of the substrate.

Hereinafter, a related art LCD will be explained with reference to the accompanying drawings.

FIG. 1 is a sectional view of a related art LCD.

At this time, as shown in FIG. 1, an LCD includes a TFT substrate 11, a color filter substrate 11a, column spacers 13 formed on the color filter substrate 11a in a rectangular shape, and an LC layer 15 injected between the TFT substrate 11 and the color filter substrate 11a.

The TFT substrate 11 and the color filter substrate 11a are attached by a sealant 17 which may be, for example, an epoxy resin. Also, although not shown, a driving circuit which outputs a control signal for displaying a picture image through a pixel is formed on a PCB and connected to the TFT substrate 11 through a Tape Carrier Package (TCP).

After manufacturing the TFT substrate 11 and the color filter substrate 11a, column spacers 13 are formed on the color filter substrate 11a. The TFT substrate 11 and the color filter substrate 11a are attached by the sealant 17.

As shown in FIG. 2, one column spacer 13 is formed per each pixel consisting of red (R), green (G) and blue (B) regions to maintain a uniform cell gap. The column spacers 13 are arranged in a stripe shape or an oblique line shape.

However, the foregoing related art LCD has the following problems.

First, since the column spacers 13 have a rectangular shape, they fail to evenly disperse the LC injected between the TFT substrate 11 and the color filter substrate 11a.

Second, the column spacers 13 have a low pressure-resistance as a result of being arranged in a stripe shape or oblique line shape. To improve the pressure-resistance of the column spacers 13, the amount of space between each of the column spacers 13 may have to be decreased. However, if the amount of space is decreased, bubbles occur in the LC, thereby deteriorating the picture quality.

Finally, rectangularly-shaped column spacers do not generate LC alignment during rubbing, thereby causing a defect in a domain of the LC.

SUMMARY OF THE INVENTION

Accordingly, the present invention is directed to an LCD device that substantially obviates one or more of the problems due to limitations and disadvantages of the related art.

An object of the present invention is to provide an LCD device in which column spacers are formed in a structure in which a high pressure-resistance is obtained and in which an LC can be injected smoothly to maintain a uniform cell gap, thereby improving the picture quality.

Another object of the present invention is to provide an LCD device in which contact areas between column spacers and a color filter substrate are minimized to enable fine control when a TFT substrate and the color filter substrate are attached to each other.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described, an LCD device includes a TFT substrate including a plurality of pixels of R, G, and B;

a color filter substrate that is spaced apart from the TFT substrate; a plurality of column spacers selectively formed on the TFT substrate or on the color filter substrate, the column spacers having a round shape at an upper portion; and a liquid crystal layer injected between the TFT substrate and the color filter substrate.

In another aspect, the LCD device includes a TFT substrate on which a plurality of TFTs and a plurality of pixel electrodes are arranged; a color filter substrate on which a plurality of color filter patterns are formed, the color filter substrate being spaced apart from the TFT substrate; a plurality of column spacers formed on the color filter substrate, each of the plurality of column spacers having a round shape at an upper portion and corresponding to two pixel electrodes; and an LC layer injected between the TFT substrate and the color filter substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

Figure 1:
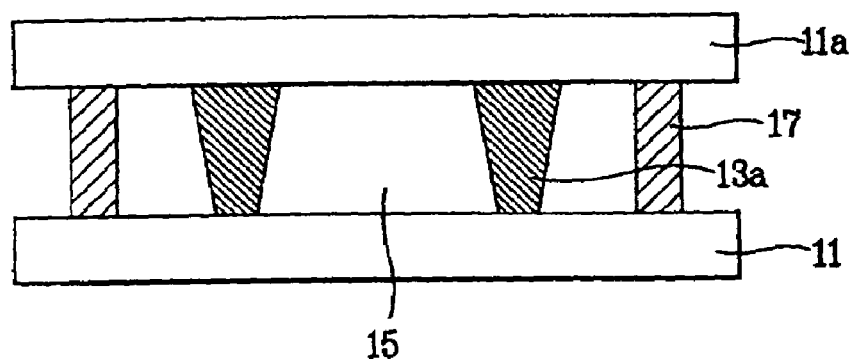
FIG. 1 illustrates a sectional view of a related art LCD device.
Figure 2:
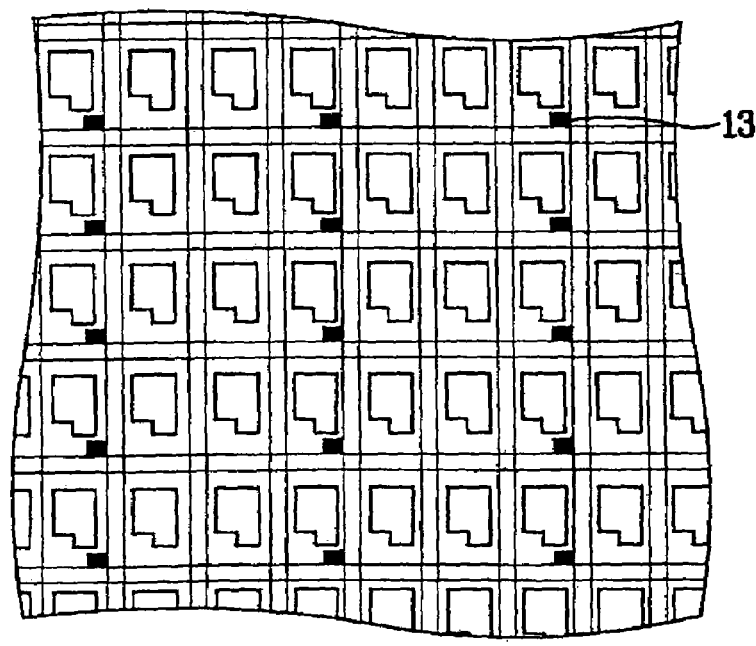
FIG. 2 illustrates a plane view of a related art LCD device.
Figure 3:
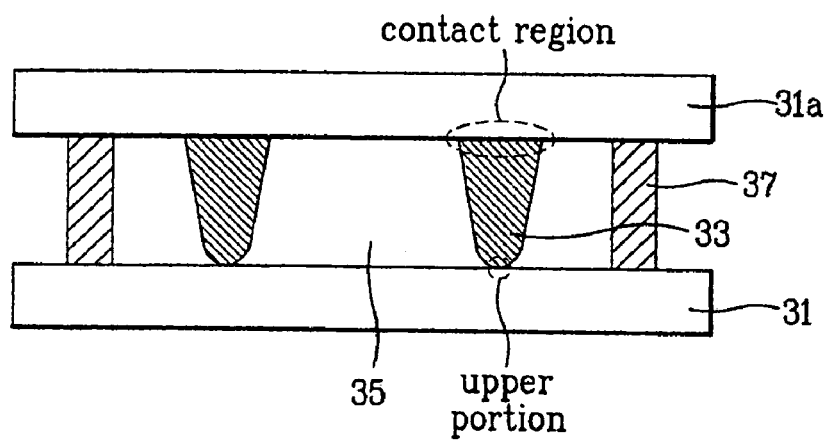
FIG. 3 illustrates a sectional view of an LCD device according to the present invention.

FIG. 3 illustrates a sectional view of an LCD device according to the present invention.

As shown in FIG. 3, the LCD device according to the present invention includes a TFT substrate 31 on which a TFT and a pixel electrode are arranged. A color filter substrate 31a is provided on which a color filter pattern and a common electrode are arranged. Column spacers 33 are provided in maintaining a cell gap between the TFT substrate 31 and the color filter substrate 31a, wherein the column spacer 33 are formed on the color filter substrate 31a and an upper (end) portion of the column spacers 33 has a semi-spherical shape. An LC layer 35 is injected between the TFT substrate 31 and the color filter substrate 31a.

At this time, the TFT substrate 31 and the color filter substrate 31a are attached to each other with a sealant 37, which may be, for example, an epoxy-resin. Then, an LC is injected between the TFT substrate 31 and the color filter substrate 31a through an LC injection hole (not shown).

The TFT substrate 31 includes a plurality of gate lines crossing a plurality of data lines, and a plurality of TFTs that serve as switching devices at the intersections of the gate lines and data lines.

Although not shown, a gate electrode is formed on the TFT substrate 31. A gate insulating layer is formed on an entire surface of the TFT substrate 31 including the gate electrode. A semiconductor layer is formed on the gate insulating layer and used as a channel of a TFT. Source and drain electrodes are formed on the semiconductor layer. Each drain electrode is electrically connected to a pixel electrode through a contact hole.

Meanwhile, the color filter substrate 31a includes a black matrix pattern, a color filter pattern of R, G, and B for displaying colors, and an ITO electrode formed on the entire surface, including the color filter pattern, to apply a voltage to the LC layer 35 together with the pixel electrode.

In the aforementioned LCD device, the TFT substrate 31 and the color filter substrate 31a are attached to each other by forming the upper surface of the column spacers 33 in a semi-spherical shape. The LC is uniformly injected into the whole region of the panel. Since the column spacers 33 have an upper surface of a semi-spherical shape, a contact area with the TFT substrate 31 can have a dot structure. Accordingly, the LC is aligned even in a region in which the column spacers are formed, thereby preventing a domain of the LCD device from being defective.

Unlike the related art arrangement wherein a single column spacer is arranged per each pixel, a single column spacer is arranged per two pixels in the present invention.

Figure 4:
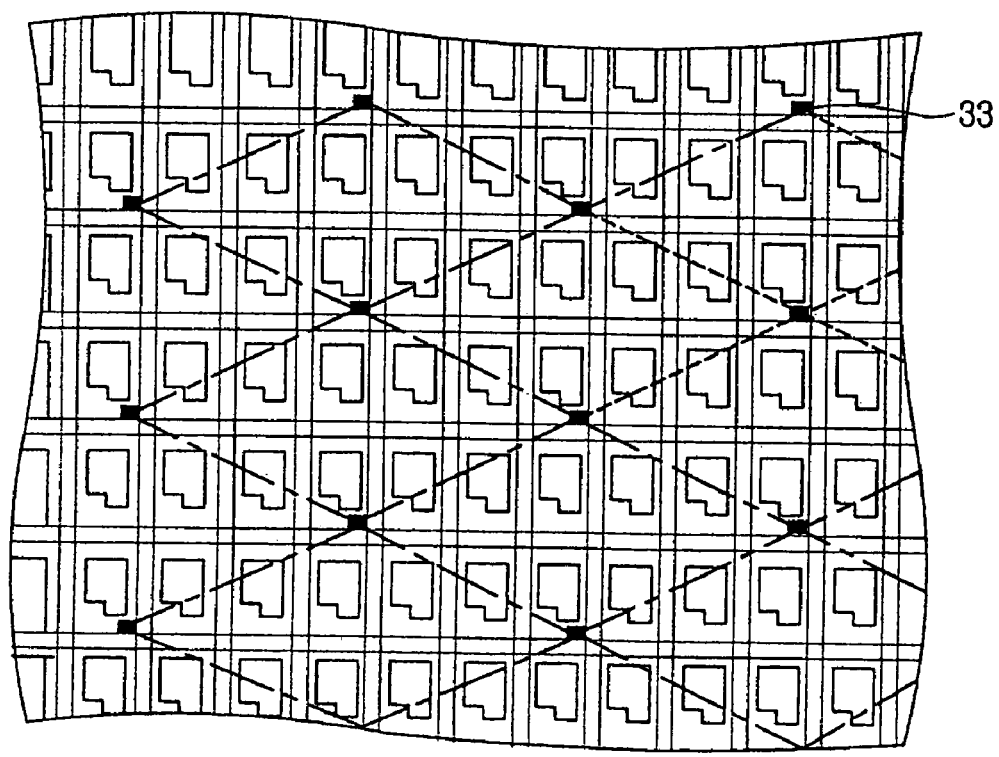
FIG. 4 illustrates a plane view of an LCD device according to the present invention.

That is, as shown in a plane view of FIG. 4, the column spacers 33 are formed at intersections of the gate lines and data lines. Also, the column spacers 33 are arranged in a diamond shape.

In the case of arranging the column spacers 33 being arranged in a diamond shape having high pressure-resistance, the spacing of the column spacers 33 can be increased compared to the spacing of the related art arrangement.

That is, where the column spacers 33 are arranged as one column spacer per two pixels as in the present invention, in contrast with the related art arrangement wherein the column spacers are arranged one per one pixel, a higher pressure-resistance can be obtained compared with the related art arrangement. It is preferable that the column spacers 33 are spaced apart from one another at a width of about 279 to 600 μm.

The contact areas between the column spacers 33 and the color filter substrate 31a serve as an important parameter when the TFT substrate 31 and the color filter substrate 31a are attached. Where the column spacers are in a rectangular shape as in the related art arrangement, the contact areas between the column spacers and the color filter substrate are wide, and the contact areas between the column spacers and the TFT substrate connected to the upper portion of the column spacers also become wide.

Generally, a TFT substrate and a color filter substrate are provisionally attached to each other and aligned. Then, the TFT substrate and the color filter substrate are finely realigned as they are moved. The wider the contact areas between the column spacers and the TFT substrate and between the column spacers and the color filter substrate become, the larger the frictional force between them becomes. Therefore, it is difficult to perform fine adjustment of the alignment.

However, in the LCD device of the present invention, the contact areas between the column spacers 33 and the color filter substrate 31a are minimized, and an upper portion of the column spacers 33 is formed in a round shape. Accordingly, the contact areas between the column spacers 33 and the TFT substrate 31 can have a dot shape, thereby decreasing the frictional force correspondingly and enabling fine adjustment of alignment.

Figure 5:
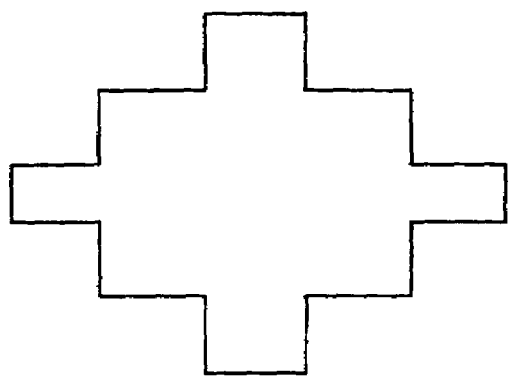
FIG. 5 illustrates a shape of a contact area between a color filter substrate and column spacers according to the present invention.

To this end, the contact areas between the column spacers 33 and the color filter substrate 31a is formed in the shape shown in FIG. 5.

As shown in FIG. 5, the contact areas between the column spacers 33 and the color filter substrate 31a are formed having a square shape with at least one protrusion from the four sides of the square.

The column spacers 33 may be formed of, for example, a resin material. The resin is deposited on the color filter substrate 31a. Then, the color filter substrate 31a is exposed and patterned using a mask having the shape shown in FIG. 5 to form the column spacers 33. Contact areas between the column spacers 33 and the color filter substrate 31a are similar to the mask shape. The column spacers 33 assume a round shape as they approach the TFT substrate 31. This is because the color filter substrate 31a is not exposed exactly at the protrusion part of the mask shape by interference of light. In this case, if the color filter substrate 31a is patterned, the column spacers 33 have a round shape.

The LCD device according to the present invention has the following advantages.

First, since the upper portion of the column spacers 33 have a round shape, the LC is injected evenly through the entire region of the panel, thereby preventing the picture quality from being deteriorated by, for example, a stain.

Second, since the column spacers 33 are arranged in diamond shapes, the outer pressure is distributed evenly with a small number of column spacers, thereby preventing a stain in the LC from worsening the picture quality or bubbles from occurring in the LC.

Third, since the contact area between the column spacers 33 and the color filter substrate 31a is minimized, the frictional force is minimized when the TFT substrate 31 and the color filter substrate 31a are attached to each other, thereby enabling fine control.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. An LCD device comprising:
   a TFT substrate including a plurality of pixels, gate lines, and data lines;
   a color filter substrate that is spaced apart from the TFT substrate;
   a plurality of column spacers selectively formed on the color filter substrate, the column spacers having a semi-spherically shaped end portion adjacent to the TFT substrate, which the plurality of column spacers are not formed; and
   a liquid crystal layer injected between the TFT substrate and the color filter substrate,
   wherein each of the plurality of column spacers are separated from one another and are disposed at intersections of the gate and data lines and each of the plurality of column spacers has a square shape contact region contacting the color filter substrate and includes a protrusion extending from each of four sides of the square shape.

2. The LCD device as claimed in claim 1, wherein one of the plurality of column spacers is provided for every two pixels along a column direction.

3. The LCD device as claimed in claim 1, wherein the semi-spherically shaped end portion has a contact area contacting the other substrate, which the column spacers are not formed on, the contact area having a dot shape.

4. An LCD device comprising:
   a TFT substrate on which a plurality of TFTs and a plurality of pixel electrodes are arranged, the TFT substrate including a plurality of gate lines and data lines;
   a color filter substrate on which a plurality of color filter patterns are formed, the color filter substrate being spaced apart from the TFT substrate;
   a plurality of column spacers formed on the color filter substrate, each of the plurality of column spacers having a semi-spherically shaped end portion adjacent to the TFT substrate and disposed at every two pixels along a column direction; and
   an LC layer injected between the TFT substrate and the color filter substrate,
   wherein each of the plurality of column spacers are separated from one another and are disposed at intersections of the gate and data lines and each of the plurality of column spacers have a square shape contact region contacting the color filter substrate with a protrusion extending from each of four sides of the square shape.

5. The LCD device as claimed in claim 5, wherein the plurality of column spacers are arranged in diamond shapes.

6. The LCD device as claimed in claim 6, wherein each of the plurality of column spacers are spaced apart from one another by a width of about 279 to 600 μm.

* * * * *